(12) United States Patent
Song et al.

(10) Patent No.: US 10,108,699 B2
(45) Date of Patent: Oct. 23, 2018

(54) ADAPTIVE QUERY SUGGESTION

(71) Applicant: MICROSOFT TECHNOLOGY LICENSING, LLC, Redmond, WA (US)

(72) Inventors: Ruihua Song, Beijing (CN); Yu Chen, Beijing (CN); Ji-Rong Wen, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 158 days.

(21) Appl. No.: 13/747,274

(22) Filed: Jan. 22, 2013

(65) Prior Publication Data

US 2014/0207746 A1    Jul. 24, 2014

(51) Int. Cl.
*G06F 17/30*    (2006.01)
(52) U.S. Cl.
CPC ................. *G06F 17/3064* (2013.01)
(58) Field of Classification Search
CPC ............... G06F 17/30864; G06F 17/30867
See application file for complete search history.

(56) References Cited

U.S. PATENT DOCUMENTS

| | | | |
|---|---|---|---|
| 6,006,225 A | 12/1999 | Bowman et al. | |
| 7,725,485 B1 * | 5/2010 | Sahami | G06F 17/3069 707/766 |
| 7,788,276 B2 * | 8/2010 | Peng et al. | 707/765 |
| 8,051,061 B2 * | 11/2011 | Niu et al. | 707/706 |
| 8,239,372 B2 * | 8/2012 | Craswell et al. | 707/713 |
| 8,458,165 B2 * | 6/2013 | Liao et al. | 707/713 |
| 8,676,798 B1 * | 3/2014 | Datta et al. | 707/735 |
| 8,700,621 B1 * | 4/2014 | Choi et al. | 707/730 |
| 8,788,514 B1 * | 7/2014 | Ramanarayanan et al. | 707/758 |
| 2006/0010126 A1 | 1/2006 | Anick et al. | |
| 2006/0085399 A1 * | 4/2006 | Carmel et al. | 707/3 |
| 2008/0235187 A1 * | 9/2008 | Gade | G06F 17/3064 |
| 2009/0043750 A1 * | 2/2009 | Barsness et al. | 707/5 |
| 2009/0171929 A1 | 7/2009 | Jing et al. | |
| 2009/0187515 A1 * | 7/2009 | Andrew | G06F 17/3064 706/12 |
| 2010/0070448 A1 * | 3/2010 | Omoigui | 706/47 |
| 2010/0114929 A1 * | 5/2010 | Bonchi | G06F 17/3064 707/759 |
| 2011/0066618 A1 * | 3/2011 | Sigurbjornsson et al. | 707/739 |
| 2011/0320472 A1 | 12/2011 | Griffith et al. | |
| 2012/0131031 A1 * | 5/2012 | Xie | G06F 17/30672 707/765 |

OTHER PUBLICATIONS

Fu et al., "Query Clustering Using a Hybrid Query Similarity Measure", 2004, WSEAS Transaction on Computers, 3(3), 700-705.*

(Continued)

*Primary Examiner* — Loc Tran
(74) *Attorney, Agent, or Firm* — Schwegman Lundberg & Woessner, P.A.

(57) ABSTRACT

When a user-submitted query is received, a set of candidate queries is identified. For each of the candidate queries, features are extracted that, for each candidate query, reflect a measure of effectiveness of the candidate query. The candidate queries are rank ordered based on the measure of effectiveness, and one or more of the top-ranked candidate queries are presented as suggested alternatives to the user-submitted query.

15 Claims, 5 Drawing Sheets

(56) References Cited

OTHER PUBLICATIONS

Radlinski et al, "Comparing the Sensitivity of Information Retrieval Metrics", Copyright 2010 ACM, 8 pages.*
Shen Jiang et al, "Query suggestion by query search: a new approach to user support in web search", 2009 IEEE. pp. 679-684.*
Yom-Tov et al, "Learning to Estimate Query Difficulty", SIGIR'05, Aug. 15-19, Salvador, Brazil, 8 pages.*
An et al, "Integrating Rule Induction and Case-Based Reasoning to Enhance Problem Solving", Second International Conference on Case-Based Reasoning, ICCBR-97. Providence, RI, USA, Jul. 25-27, 1997, 9 pages.*
Leake et al, "Case-Based Reasoning Research and Development", Second International Conference on Case-Based Reasoning, ICCBR-97. Providence, RI, USA, Jul. 25-27, 1997, 9 pages.*
Huang et al, "Analyzing and Evaluating Query Reformulation Strategies in Web Search Logs", CIKM'09, Nov. 2-6, 2009, Hong Kong, China, 9 pages.*
Diriye, et al., "Interactive Search Support for Difficult Web Queries", <<http://jeffhuang.com/ Final_DifficultQueries_ECIR12.pdf>>, Proceedings of 34th European Conference on Advances in Information Retrieval (ECIR), Apr. 2012, pp. 37-49.
Fonseca, et al., "Concept Based Interactive Query Expansion", <<http://homepages.dcc.ufmg.br/~nivio/papers/cikm05-fullpaper.pdf>>, Proceedings of 14th ACM International Conference on Information and Knowledge Management (CIKM), 2005, pp. 696-703.
Kotov, et al., "Interactive Sense Feedback for Difficult Queries", <<http://www.mathcs.emory.edu/~kotov/papers/kotov-cikm11.pdf>>, Proceeding of 20th ACM International Conference on Information and Knowledge Management (CIKM), 2011, pp. 163-172.
Wang, "Improving Web Search for Difficult Queries", <<https://www.ideals.uiuc.edu/bitstream/handle/2142/13600/dq-xuanhui.pdf?sequence=2 >>, PhD Dissertation, University of Illinois at Urbana-Champaign, 2009, 142 pages.

* cited by examiner

ADAPTIVE QUERY SUGGESTION

BACKGROUND

It is often difficult for users to compose queries that provide useful results when searching the Web or other document sources. Even though the desired results of a query may be clear, from a human perspective, a query-based search may return results that are either irrelevant or not authoritative enough. A few examples of such searches are those that are based on queries having key terms that do not match the key terms in the desired result documents, queries that are too general, or queries that are too specific.

Two techniques that may be used to improve user-submitted queries are query reformulation and query suggestion. Query reformulation is a process by which a user-submitted query is improved by correcting misspelled words, suggesting more frequently used terms that are slightly different from the original terms, and so on. Query reformulation is often performed automatically, without explicit interactions with the user.

Query suggestion is a technique for assisting users to interactively refine queries. Existing query suggestion techniques typically suggest alternate queries based on each alternate query's similarity or relevance to the original user-submitted query.

SUMMARY

This document describes adaptive query suggestion. In one aspect, a user-submitted query is analyzed to determine a degree of difficulty associated with the query. For an easy user-submitted query, no suggestions are offered, but for a difficult user-submitted query, alternative queries may be suggested. To select alternative queries, multiple candidate queries are identified and features representing an effectiveness of the candidate queries with respect to the original query are extracted. The candidate queries are rank ordered based on the measured effectiveness of each candidate query, and a top number of the rank ordered candidate queries are presented as alternatives to the user-submitted query.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

User-submitted search queries often do not return results that are as relevant or authoritative as a user would prefer. Adaptive query suggestion is a technique by which, for a user-submitted query, alternate queries may be suggested, which will likely provide more desirable query results.

Adaptive query suggestion, as described herein, provides alternate query suggestions for queries that are identified as "difficult" queries, but does not bother the user with alternate query suggestions when the user-submitted query is not deemed a "difficult" query. For example, if a user submits a query that will likely return relevant and authoritative results, offering the user alternate suggestions to the user-submitted query is more likely to annoy the user, rather than enable the user to obtain more relevant search results. Providing alternate query suggestions only when the user-submitted query is not expected to provide relevant or authoritative results improves the overall user experience.

Furthermore, rather than identifying a query suggestion based on the alternate query's relevance to the original user-submitted query (which may very well also return irrelevant query results), adaptive query suggestion, as described herein, suggests alternate queries based on a usefulness probability of each suggested alternative. To determine a particular query's usefulness probability, features of the particular query and the results it will return are determined based, at least in part, on similarity and effectiveness measurements. After identifying a set of alternate candidate queries, the features of those queries are then used to rank order the set of candidate queries to identify a number of alternate queries determined to have the greatest usefulness probability with regard to the original user-submitted query. Those queries are then presented to the user as suggested alternatives.

Figure 1:
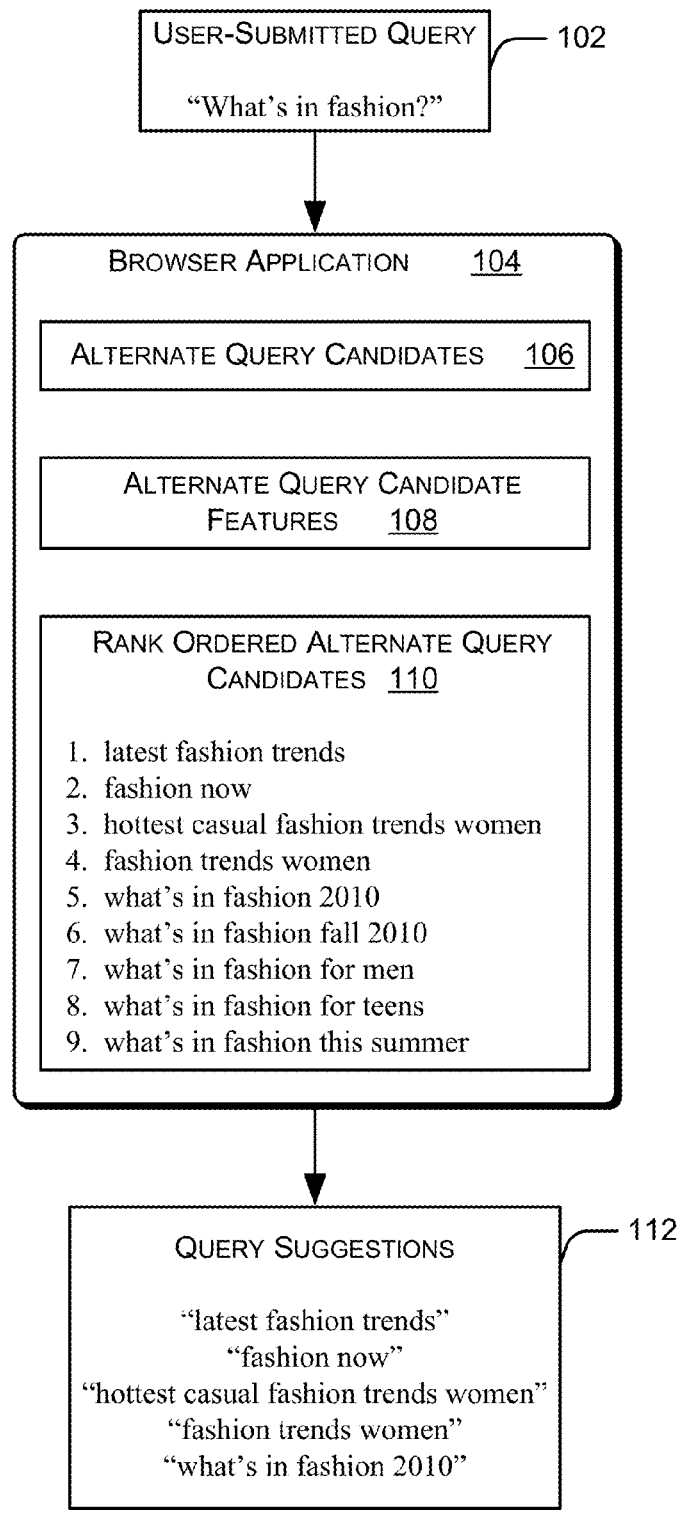
FIG. 1 is a block diagram of an example Internet search scenario using adaptive query suggestion.

FIG. 1 illustrates an example scenario using adaptive query suggestion. Block 102 represents a user-submitted query, "what's in fashion?" that is submitted to a browser application 104. The browser application identifies a plurality of alternate query candidates 106, based on the user-submitted query 102, and determines features 108 of the alternate query candidates 106. The alternate query candidates are then ranked in order 110 based on the determined features. The browser application outputs a pre-determined number of the alternate query candidates (e.g., the top five candidates in the rank ordered list) as query suggestions 112.

Identifying Candidate Queries

As described above, in response to receiving a user-submitted query, the browser application identifies a plurality of candidate queries. Any number of techniques may be used to identify candidate queries. In an example implementation, query clusters are mined from click-through data and the candidate queries are selected based on the query clusters.

First, a click-through bipartite graph is constructed from search logs collected by one or more search engines over a period of time. An edge, $e_{ij}$, is created between a query node, $q_i$, and a URL node, $u_j$, if $u_j$ has been clicked when users submitted $q_i$. The weight, $w_{ij}$, of edge $e_{ij}$ is the aggregated click number. The query, $q_i$, is then represented as an $L_2$-normalized vector, in which each dimension corresponds to a URL. If edge $e_{ij}$ exists, then the value of the dimension is normalized $w_{ij}$; otherwise, it is zero.

Second, an algorithm is applied to scan through the queries and create a set of clusters. For each query, q, the algorithm first finds the closest cluster, C, and then tests the diameter of $C \cup \{q\}$. If the diameter is not larger than $D_{max}$ (a predefined maximum size for each cluster), q is merged into C. Otherwise, a new cluster is created with q as its first member.

Third, the queries in each query cluster are divided into intent groups. When examining query clusters, it becomes apparent that the search intents of some queries are almost the same. Despite slight differences in form, queries with the same intent can safely be treated as duplicates of one another. Such differences in form may be due to misspellings, inclusion or exclusion of stop words, different tenses, equivalent syntax, and so on. For example, "jet bleu", "jetbue" and "jetb" share the same intent with "jetblue". Users would likely be annoyed if such variations were presented as alternate query suggestions.

To account for such duplicate queries, a sequence of transformation operations are applied to the queries in each cluster, and queries are grouped together if their edit distance after the transformation operations is less than a threshold. Example transformation operations may include spelling correction, stop words removal, stemming, term sorting, and so on. After the queries in each cluster are grouped, the most frequent query in each group is identified as the group leader, which will be returned as a candidate on behalf of the group.

Given an original query, q, the cluster containing q is found using a query-cluster map, and all of the group leaders in the cluster are returned as alternate query candidates for q.

Extracting Candidate Query Features

Figure 2:
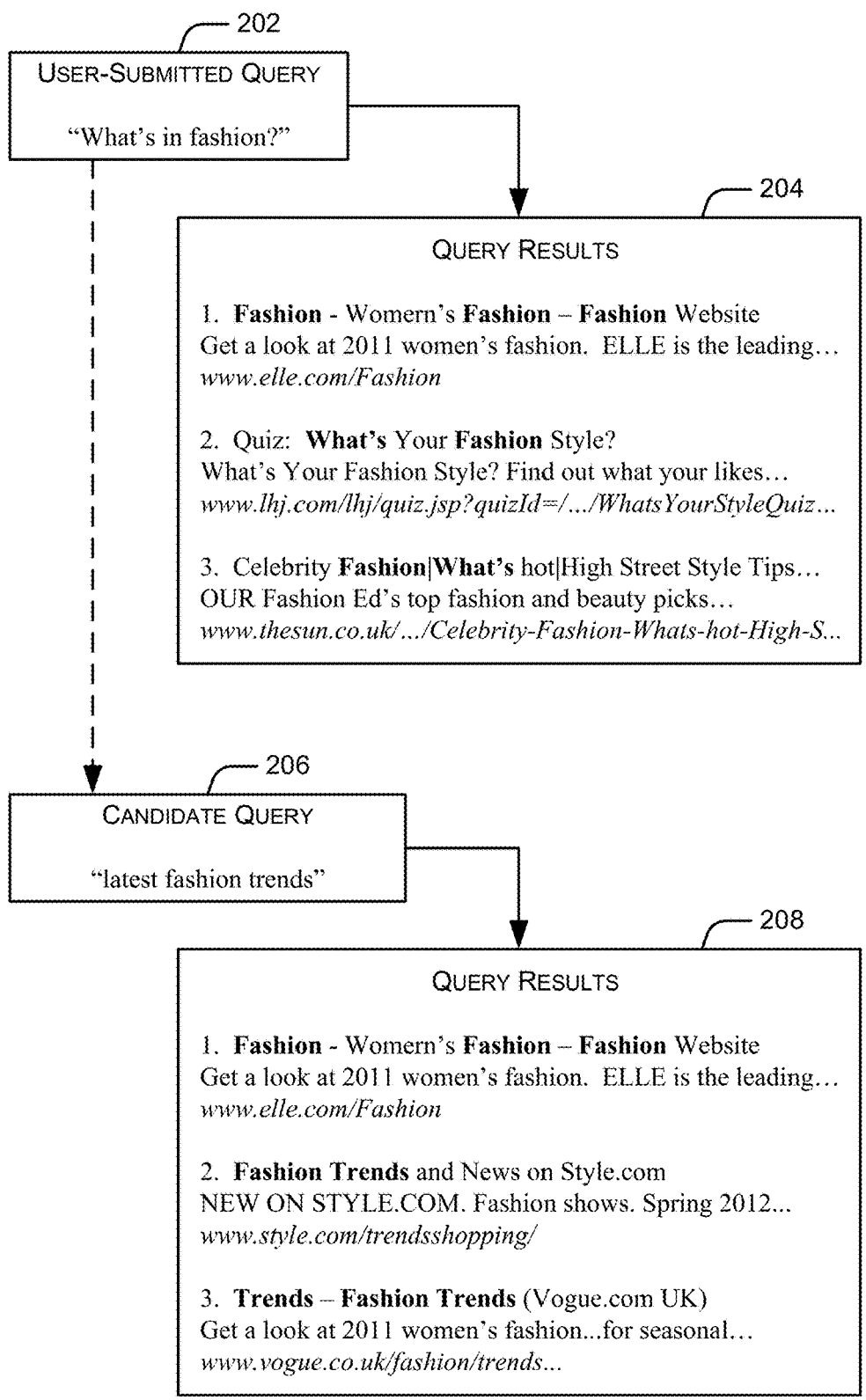
FIG. 2 is a pictorial diagram of an example user-submitted query, an example candidate query, and example search results for each.

FIG. 2 illustrates an example user-submitted query and an example candidate query, with query results for each. User-submitted query, q, is represented by block 202. The top three search results for query q, represented by S(q), are shown in block 204. Similarly, an example candidate query, c, is represented by block 204, and its corresponding top three search results, represented by S(c), are shown in block 208.

Figure 3:
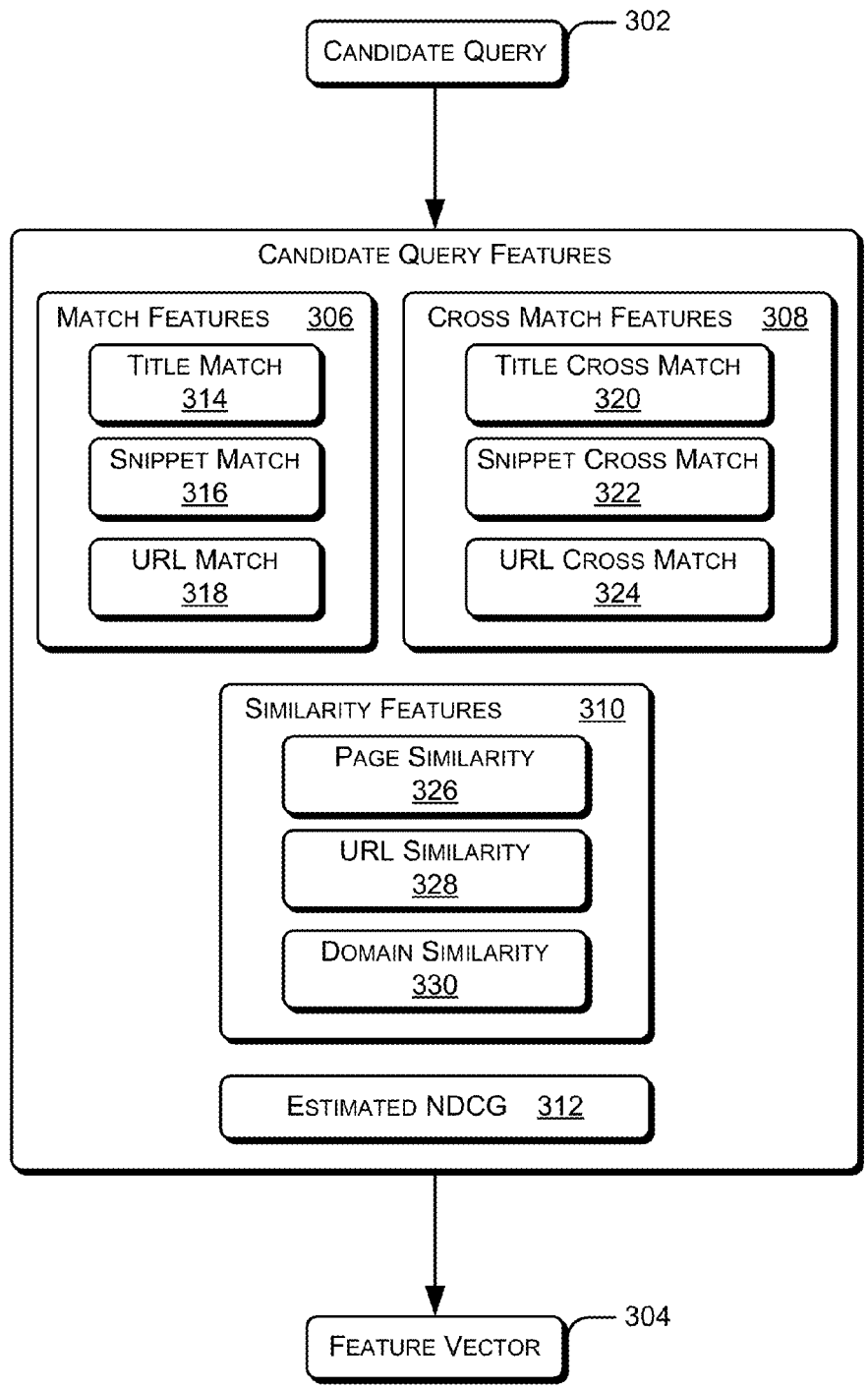
FIG. 3 is a block diagram of example components of a feature vector generated for a candidate query.

FIG. 3 illustrates generation of a feature vector for a candidate query. For each identified candidate query 302, a feature vector 304 is determined to estimate the usefulness of the candidate query. The feature vector is determined based on $\langle q, S(q), c_i, S(c_i) \rangle$, where q represents the user-submitted query, S(q) represents search results for q, $c_i$ represents a candidate query, and $S(c_i)$ represents search results for $c_i$. In an example implementation, the feature vector includes match features 306, cross match features 308, similarity features 310, and an estimated NDCG 312.

Match features 306 are determined from $c_i$ and $S(c_i)$, and provide a measure of how well the candidate query matches its own search results. Search results typically include at least three components, namely, a title, a snippet, and a URL. Accordingly, match features may be determined for each, namely, a title match 314, a snippet match 316, and URL match 318. For example, as shown in FIG. 2, the first query result shown in block 204 includes a title, "Fashion— Women's Fashion—Fashion Website," a snippet, "Get a look at 2011 women's fashion. ELLE is the leading . . . ," and a URL, "www.elle.com/Fashion."

Given candidate query $c_i$ and a title $T_{i,j}$ which is the title of the j-th result in $S(c_i)$, stop words are removed from the candidate query and a stemming process is applied to the remaining terms in the candidate query and to terms in the title to account for various forms (plural, singular, past, present) of each term. A match score is then calculated according to:

$$MatchScore(c_i, T_{i,j}) = \sum_{t_k \in c_i} \frac{TF(t_k, T_{i,j}) * weight(t_k)}{length(T_{i,j})}$$

where $TF(t_k, T_{i,j})$ represents the term frequency, or number of times that term $t_k$ (e.g., a term found in candidate query $c_i$) occurs in the title, $T_{i,j}$, weight $(t_k)$ represents the weight of the term within the title, and length $(T_{i,j})$ represents the length of the title as a number of words. For each term, weight $(t_k)$ indicates how strong the term is in distinguishing one document from other documents. In an example implementation, the weight of a term is based on the inverse document frequency (IDF) of the term. The IDF, or weight, of a particular term, $t_k$, may be calculated according to:

$$weight(t_k) = \log \frac{N - n(t_k) + 0.5}{n(t_k) + 0.5}$$

where N is the total number of query results and $n(t_k)$ is the number of query results having a title that contains the term $t_k$.

The title match feature for a given candidate query, $c_i$, is then calculated by aggregating the match scores for the titles of each of the top N search results and discounting the match score by the position of the title according to:

$$TitleMatch(c_i) = \sum_{j=1}^{N} \frac{MatchScore(c_i, T_{i,j})}{\log(j+1)}$$

Similarly, for candidate query $c_i$ and a snippet $P_{i,j}$, which is the snippet of the j-th result in $S(c_i)$, stop words may be removed from the candidate query and a stemming process may be applied to the remaining terms in the candidate query and to terms in the snippet. A match score is then calculated according to:

$$MatchScore(c_i, P_{i,j}) = \sum_{t_k \in c_i} \frac{TF(t_k, P_{i,j}) * weight(t_k)}{length(P_{i,j})}$$

where $TF(t_k, P_{i,j})$ represents the term frequency, or number of times that term $t_k$ (e.g., a term found in candidate query $c_i$) occurs in the snippet, $P_{i,j}$, weight $(t_k)$ represents the weight of the term within the snippet, and length $(P_{i,j})$ represents the length of the snippet as a number of words.

The snippet match feature for a given candidate query, is then calculated by aggregating the match scores for the snippets of each of the top N search results and discounting the match score by the position of the snippet according to:

$$SnippetMatch(c_i) = \sum_{j=1}^{N} \frac{MatchScore(c_i, P_{i,j})}{\log(j+1)}$$

Furthermore, for candidate query $c_i$ and a URL $U_{i,j}$, which is the URL of the j-th result in $S(c_i)$, stop words may be removed from the candidate query and a stemming process may be applied to the remaining terms in the candidate query. In addition, the URL may be broken up into individual terms by removing each non-alpha-numeric character and a stemming process may be applied to the terms in the URL. A match score is then calculated according to:

$$MatchScore(c_i, U_{i,j}) = \sum_{t_k \in c_i} \frac{TF(t_k, U_{i,j}) * weight(t_k)}{length(U_{i,j})}$$

where $TF(t_k, U_{i,j})$ represents the term frequency, or number of times that term $t_k$ (e.g., a term found in candidate query $c_i$) occurs in the URL, $U_{i,j}$, weight $(t_k)$ represents the weight of the term within the URL, and length $(U_{i,j})$ represents the length of the URL as a number of words.

The URL match feature for a given candidate query, $c_i$, is then calculated by aggregating the match scores for the URLs of each of the top N search results and discounting the match score by the position of the URL according to:

$$URLMatch(c_i) = \sum_{j=1}^{N} \frac{MatchScore(c_i, U_{i,j})}{\log(j+1)}$$

Cross match features 308 are determined from q and $S(c_i)$, and provide a measure of how well the candidate query's search results match the original query, q. Similar to the match features described above, cross match features may include a title cross match 320, a snippet cross match 322, and a URL cross match 324.

Given query q and a title $T_{i,j}$, which is the title of the j-th result in $S(c_i)$, stop words may be removed from the candidate query and a stemming process may be applied to the remaining terms in the candidate query and to terms in the title. A cross match score is then calculated according to:

$$CrossMatchScore(q, T_{i,j}) = \sum_{t_k \in q} \frac{TF(t_k, T_{i,j}) * weight(t_k)}{length(T_{i,j})}$$

where $TF(t_k, T_{i,j})$ represents the term frequency, or number of times that term $t_k$ (e.g., a term found in query q) occurs in the title, $T_{i,j}$, weight $(t_k)$ represents the weight of the term within the title, and length $(T_{i,j})$ represents the length of the title as a number of words.

The title cross match feature for a given candidate query, $c_i$, is then calculated by aggregating the cross match scores for the titles of each of the top N search results and discounting the cross match score by the position of the title according to:

$$TitleCrossMatch(c_i) = \sum_{j=1}^{N} \frac{CrossMatchScore(q, T_{i,j})}{\log(j+1)}$$

Similarly, for query q and a snippet $P_{i,j}$, which is the snippet of the j-th result in $S(c_i)$, stop words may be removed from the candidate query and a stemming process may be applied to the remaining terms in the candidate query and to terms in the snippet. A cross match score is then calculated according to:

$$CrossMatchScore(q, P_{i,j}) = \sum_{t_k \in c_i} \frac{TF(t_k, P_{i,j}) * weight(t_k)}{length(P_{i,j})}$$

where $TF(t_k, P_{i,j})$ represents the term frequency, or number of times that term $t_k$ (e.g., a term found in query q) occurs in the snippet, $P_{i,j}$, weight $(t_k)$ represents the weight of the term within the snippet, and length $(P_{i,j})$ represents the length of the snippet as a number of words.

The snippet cross match feature for a given candidate query, $c_i$, is then calculated by aggregating the cross match scores for the snippets of each of the top N search results and discounting the cross match score by the position of the snippet according to:

$$SnippetCrossMatch(c_i) = \sum_{j=1}^{N} \frac{CrossMatchScore(q, P_{i,j})}{\log(j+1)}$$

Furthermore, for query q and a URL $U_{i,j}$, which is the URL of the j-th result in $S(c_i)$, stop words may be removed from the candidate query and a stemming process may be applied to the remaining terms in the candidate query. In addition, the URL may be broken up into individual terms by removing each non-alpha-numeric character and a stemming process may be applied to the terms in the URL. A cross match score is then calculated according to:

$$CrossMatchScore(q, U_{i,j}) = \sum_{t_k \in c_i} \frac{TF(t_k, U_{i,j}) * weight(t_k)}{length(U_{i,j})}$$

where $TF(t_k, U_{i,j})$ represents the term frequency, or number of times that term $t_k$ (e.g., a term found in query q) occurs in the URL, $U_{i,j}$, weight $(t_k)$ represents the weight of the term within the URL, and length $(U_{i,j})$ represents the length of the URL as a number of words.

The URL cross match feature for a given candidate query, $c_i$, is then calculated by aggregating the cross match scores for the URLs of each of the top N search results and discounting the cross match score by the position of the URL according to:

$$URLCrossMatch(c_i) = \sum_{j=1}^{N} \frac{MatchScore(q, U_{i,j})}{\log(j+1)}$$

Similarity features 310 are determined from $S(q)$ and $S(c_i)$, and provide a measure of similarity between the search results of the original query and the search results of the candidate query. Because of the desire for $S(c_i)$ to meet the information need of the original query, q, the topic of $S(c_i)$ should not drift too far from the topic of $S(q)$. However, if $S(c_i)$ and $S(q)$ are too similar, then it can be reasoned that $c_i$ will not provide more useful results than q.

To account for possible topic drift, a page similarity 326 is calculated by the cosine similarity between vectors of S(q) and S($c_i$), where the vectors are formed by the terms in the search results after stop word removal and stemming. In an example implementation, a TF-IDF formula is used to weigh the terms.

To further determine how similar the results are between the original query, q, and the candidate query, a URL similarity 328 and a domain similarity 330 are calculated. The URL similarity is based on the number of URLs that are found in both S(q) and S($c_i$). Correspondingly, the domain similarity is based on the number of domains, as derived from the URLs, that are found in both S(q) and S($c_i$).

In an example implementation, the final feature in the feature vector is the estimated normalized discounted cumulative gain (ENDCG) 312. Normalized discounted cumulative gain (NDCG) is commonly used to measure the effectiveness of search engines. In an example implementation, for an original query, q, a judged document set (i.e., query results), which may be pooled from any number of search engines and directly judged by humans, is used to evaluate a query suggestion, $s_i$. In an example implementation, each of the documents in the judged document set is given a relevance rating. In an example implementation, five distinct values may be used (e.g., 4, 3, 2, 1, and 0) each corresponding to a relevance rating (e.g., perfect, excellent, good, fair, and bad). The query results are positioned based on the order in which they are returned, such that the top listed result is given a position of 1, the second listed result is given a position of 2, and so on. The NDCG of the query suggestion, $s_i$, is defined as:

$$NDCG@k = \frac{DCG@k}{IDCG@k}$$

where IDCG@k represents the maximum (ideal) DCG@k, and DCG@k is calculated according to:

$$DCG@k = \sum_{i=1}^{k} \frac{2^{rating(i)} - 1}{\log(1 + i)}$$

where rating(i) is the relevance rating of the document at position i in the list of k query results, where k is less than or equal to the total number of query results returned. In an example implementation, any documents in the query results list that have not be given a relevance rating are assigned a 0 or "bad" rating by default.

As described above, the NDCG is calculated based on query results that have been given relevance ratings through human analysis. However, such analysis is not feasible in real-time. Accordingly, in an example implementation, for each search result returned in response to a candidate query, a relevance rating is estimated. An estimated NDCG may then be calculated to reflect, to some extent, how relevant a set of search results for a candidate query is to the original query. The estimated NDCG may then be used to reflect the difficulty of the original query.

In an example implementation, an assumption is made that if a particular document is returned as one of the top search results of multiple candidate queries, it is likely to be relevant to the original query. Given the original query, q, the top search results of the candidate queries, $c_i$, form a search result collection represented by:

$\cup_{i=1}^{m} S(c_i)$ where m is the number of candidate queries. An estimated relevance rating for any given document in S($c_i$) may be determined as a count of the number of times the document is returned in the top ten (or other defined number) search results over all of the candidate queries $c_i$.

The ENDCG for a particular candidate query, may then be calculated according to:

$$ENDCG@k = \frac{EDCG@k}{IDCG@k}$$

where EDCG@k is calculated according to:

$$EDCG@k = \sum_{i=1}^{k} \frac{2^{est \cdot rating(i)} - 1}{\log(1 + i)}$$

where est.rating(i) is the estimated relevance rating of the document at position i in the list of query results.

Accordingly, for each candidate query, $c_i$, a feature vector, $x_i$, may be defined as:

$x_i$=( TitleMatch($c_i$),SnippetMatch($c_i$),URLMatch($c_i$),
TitleCrossMatch($c_i$),SnippetCrossMatch($c_i$),
URLCrossMatch($c_i$),PageSimilarity($c_i$),URL-
Similarity($c_i$),DomainSimilarity($c_i$),ENDCG($c_i$) )

Ranking Candidate Queries

The feature vectors that are determined for each of the candidate queries may be utilized to rank the candidate queries in order based on their effectiveness, according to a ranking model. In an example implementation, a known pairwise learning-to-rank method, RankSVM, is used to rank the candidates. A support vector machine (SVM) for ranking (e.g., RankSVM) focuses on the relative order between two items in a ranking list and its objective of learning is to directly minimize the number of item pairs with reverse order. Given a list of candidates, RankSVM outputs a prediction score for each candidate, which is then used to rank the candidates by sorting them by the prediction score in descending order.

Given a candidate set:

$C=\{(x_i,y_i)|x_i \in \mathbb{R}^d, y_i \in R^1\}$ where $y_i$ is the retrieval performance (e.g., NDCG@3) of a candidate $c_i$ and $x_i$ is the feature vector of candidate $c_i$, a ranking function can be defined as:

$$f(x) = \sum_{i=1}^{l} (-\alpha_i) y_i K(x_i, x) + b^*$$

where K(•) is the kernel function, l is the number of values in the candidate set, and $\alpha_i$, b* are coefficients determined by an SVM model generation algorithm to minimize ranking errors. In an example implementation, a radial base function (RBF) kernel is used as the kernel function.

The error function for incorrect pairwise ordering is defined as:

$$\Theta_f(x_i, x_j) = \begin{cases} 1, & \text{if sign}(f(x_i) - f(x_j)) \neq \text{sign}(y_i - y_j) \\ 0, & \text{otherwise} \end{cases}$$

Finally, an optimal ranking function, $f^*$ can be learned through training data by minimizing the overall ranking errors according to:

$$f^* = \operatorname*{argmin}_{f} \sum_{x_i \in C} \sum_{x_j \in C} \Theta_f(x_i, x_j)$$

In an example implementation, the training data used to learn the ranking function includes only queries determined to be difficult (e.g., having an NDCG@3 less than a threshold value, such as 0.4).

Once a list of candidate queries is ranked, the top n candidate queries are used to form a suggestion list. Using the NDCG values (or estimated NDCG values) for each suggestion in a suggestion list, a quality of the suggestion list can be measured. Given a list of n suggestions, it is impossible to predict which of the suggestions may be selected by a user. Accordingly, a quality measure of the list, denoted as Max@n, may be calculated as the maximum NDCG@k achievable using the n suggestions, where k refers to the first k results of each of n suggested queries. For example, for an original query, if the NDCG@3 values (k=3) for the top five suggestions (n=5) are <0.4, 0.6, 0.5, 0.7, 0.2>, then Max@1 is 0.4; Max@2 is 0.6; Max@3 is 0.6; Max@4 is 0.7; and Max@5 is 0.7. In other words, given an original query, q, a suggestion list $<s_1, s_2, \ldots, s_n>$ of candidate queries is determined. For each suggested query, $s_i$, a search engine returns a set of results $<r_{i1}, r_{i2}, \ldots, r_{im}>$, where i=1, 2, . . . , n. For each suggested query, $s_i$, an NDCG@k value is determined, and may be represented as NDCG@k($s_1$), NDCG@k($s_2$), . . . , NDCG@k($s_n$). Based on the determined NDCG@k values, Max@ 1 is equal to NDCG@k($s_1$); Max@2 is equal to the larger of NDCG@k ($s_1$) and NDCG@k($s_2$); Max@3 is equal to the larger of NDCG@k($s_1$), NDCG@k($s_2$), and NDCG@k($s_3$); and so on. A monotonically increasing curve may be used to describe the Max@n values.

The overall quality of the suggestion list may then be denoted by SDCG@n according to:

$$SDCG@n = \sum_{i=1}^{n} \frac{NDCG@k(i)}{\log(1+i)}$$

where n is the total number of suggestions in a suggestion list and NDCG@k(i) is the quality of the suggestion at position i.

Example Environment

Figure 4:
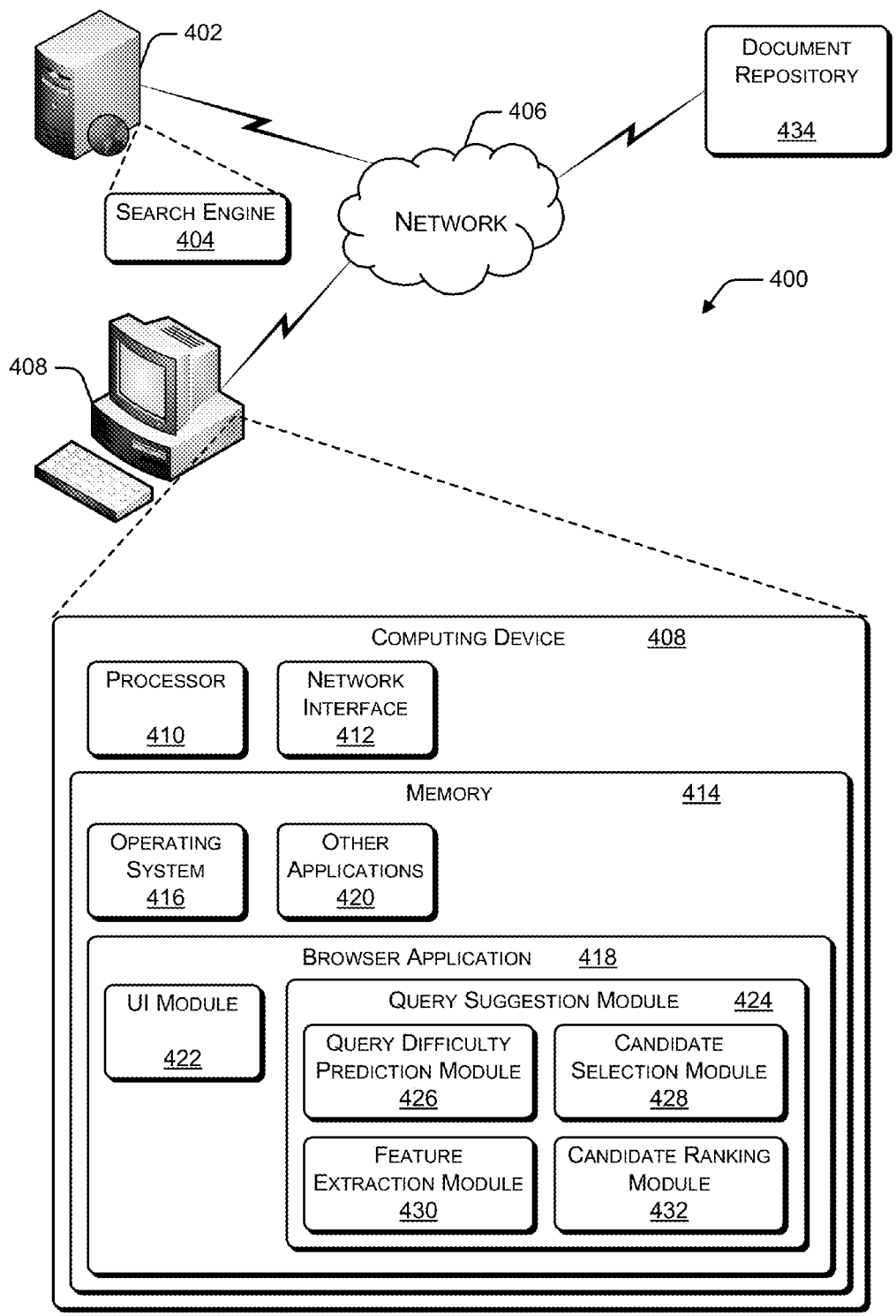
FIG. 4 is a block diagram of an example environment in which adaptive query suggestion may be implemented.

FIG. 4 illustrates an example environment 400 usable to implement adaptive query suggestion. Example environment 400 includes a web server 402 that hosts a search engine 404 that is accessible over a network 406. Network 406 is representative of, for example, the Internet.

Computing device 408 is configured to access the search engine 404 over the network 406. Computing device 408 is representative of any network-capable computing device, including, but not limited to, a desktop computer system, a laptop computer system, a television system, a gaming system, a mobile smartphone, a table computer system, and so on.

Example computing device 408 includes one or more processors 410, one or more network interfaces 412, and memory 414. Network interface 412 enables computing device 408 to communicate with other devices over a network.

An operating system 416, a browser application 418, and one or more other applications 420 are stored in memory 414 as computer-readable instructions, and are executed, at least in part, by processor 410. The browser application 418 includes a user interface module 422 and a query suggestion module 424. Although not illustrated in FIG. 4, browser application 418 may also include other functionality not represented by the illustrated modules.

User interface module 422 provides means by which a user may submit a query and receive query results. Query suggestion module 424 implements adaptive query suggestion to suggest alternate queries when a user-submitted query is determined to be difficult (i.e., not likely to return relevant or authoritative results). Example query suggestion module 424 includes query difficulty prediction module 426, candidate selection module 428, feature extraction module 430, and candidate ranking module 432.

Query difficulty prediction module 426 evaluates a user-submitted query to determine a difficulty score. If the difficulty score is less than a threshold value, then the user-submitted query is identified as a difficult query.

Candidate selection module 428 identifies alternate queries that are candidates for a limited number of slots for alternate query suggestions. For example, the candidate selection module 428 may identify 15 candidate queries, but only five slots may be available for alternate query suggestions.

Feature extraction module 430 extracts features from the identified candidate queries to generate feature vectors. Features may be based on the original user-submitted query, query results for the user-submitted query, a candidate query, and query results for the candidate query. Features may include match features, cross match features, similarity features, and an estimated NDCG value.

Candidate ranking module 432 employs a ranking function to rank order the candidate queries based on the feature vectors of the candidate queries. The candidate queries are ordered based on each query's effectiveness.

Although described herein with reference to a browser application and an Internet search engine, adaptive query suggestion may be implemented in other search environments. For example, browser application 418 may represent an interface for searching a document repository 434, which may or may not be accessible via the Internet. For example, document repository 434 may be accessible via a local area network or may be stored on computing device 408.

Although illustrated in FIG. 4 as being stored in memory 414 of computing device 408, browser application 418, or portions thereof, may be implemented using any form of computer-readable media that is accessible by computing device 408. Furthermore, in alternate implementations, one or more components of operating system 416, browser application 418, and other applications 420 may be implemented as part of an integrated circuit that is part of, or accessible to, computing device 408.

Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device.

In contrast, communication media may embody computer readable instructions, data structures, program modules, or other data in a modulated data signal, such as a carrier wave, or other mechanism. As defined herein, computer storage media does not include communication media.

Example Operation

Figure 5:
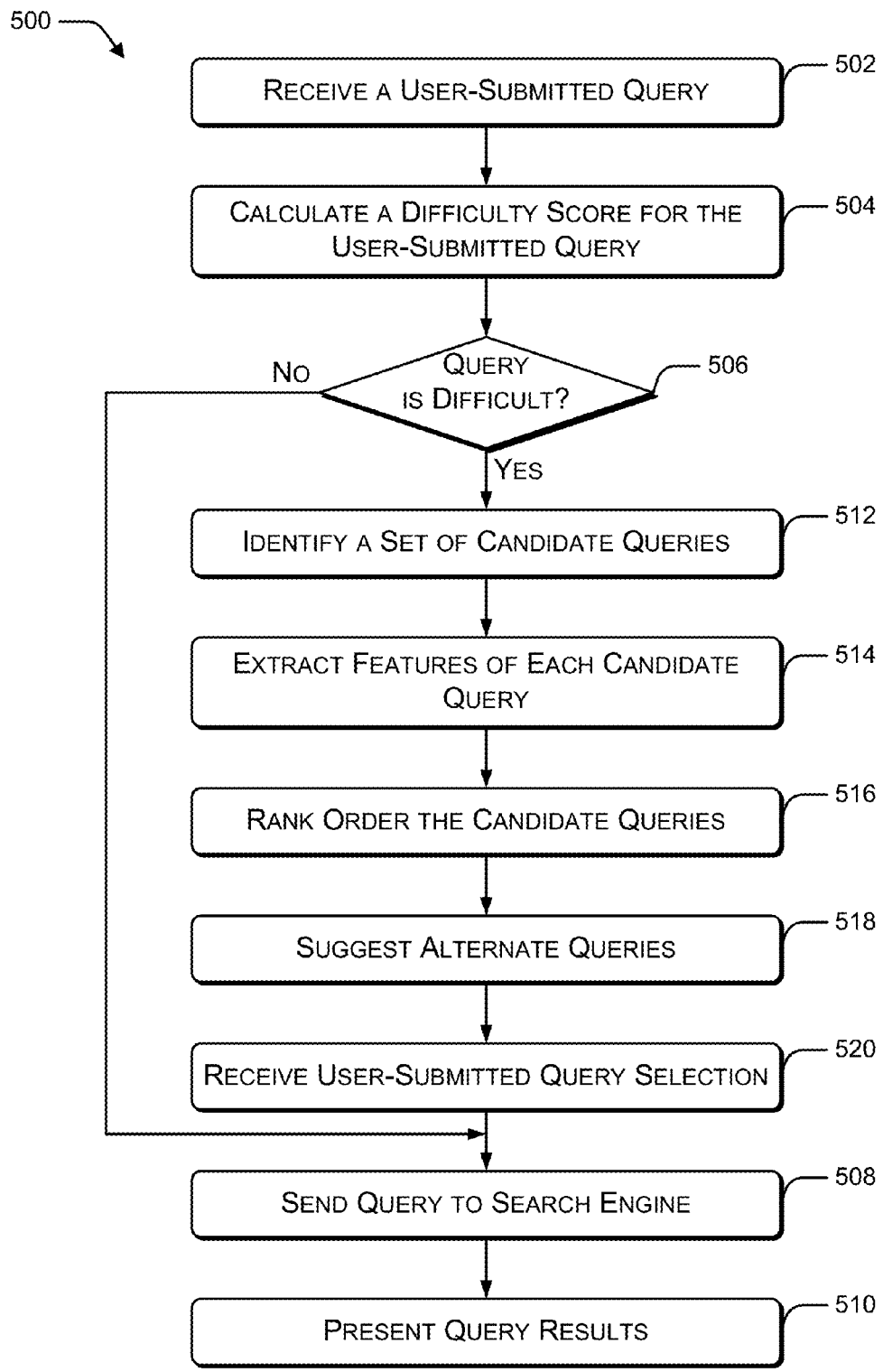
FIG. 5 is a flow diagram of an example process for implementing adaptive query suggestion.

FIG. 5 illustrates an example process 500 for implementing adaptive query suggestion as described herein. This process is illustrated as a collection of blocks in a logical flow graph, which represents a sequence of operations that can be implemented in hardware, software, or a combination thereof. In the context of software, the blocks represent computer-executable instructions stored on one or more computer storage media that, when executed by one or more processors, cause the processors to perform the recited operations. Note that the order in which the process is described is not intended to be construed as a limitation, and any number of the described process blocks can be combined in any order to implement the process, or alternate processes. Additionally, individual blocks may be deleted from the process without departing from the spirit and scope of the subject matter described herein. Furthermore, while this process is described with reference to the computing device 408 described above with reference to FIG. 4, other computer architectures may implement one or more portions of this process, in whole or in part.

At block 502, a user-submitted query is received. For example, as illustrated in FIG. 4, browser application 418 receives a user-submitted query through the user interface module 422.

At block 504, a difficulty score is calculated for the user-submitted query. Various methods exist or may be developed for predicting query difficulty, and any of these methods may be used. In an example implementation, the query difficulty prediction module 426 implements the rank-time performance prediction (RAPP) method, which uses the ranking scores, as well as the features that are used for ranking documents (e.g., BM25, click, and PageRank), to predict the quality of the search results. Three-fold cross validation is conducted to train a regressor using training data that includes both easy queries and difficult queries. The predicted difficulty value for a query, q, is denoted by g(q).

At block 506, a determination is made regarding whether or not the user-submitted query is a difficult query. For example, the predicted difficulty value for the user-submitted query, as determined by the query difficulty prediction module 426, is compared to a threshold value. If the predicted query difficulty is less than the threshold value, then the user-submitted query is identified as a difficult query.

If the user-submitted query is not identified as a difficult query (the "No" branch from block 506), then at block 508, the user-submitted query is sent to a search engine; and at block 510, the query results are received and presented through the user interface module 422.

On the other hand, if the user-submitted query is identified as a difficult query (the "Yes" branch from block 506), then at block 512, a set of candidate queries is generated. For example, candidate selection module 428 identifies a set of candidate queries based on the user-submitted query. As described above, in an example implementation candidate selection module 428 may use a query-cluster map to identify alternate query candidates.

At block 514, features of each identified candidate query are extracted. For example, feature extraction module 430 may determine any combination of match features, cross match features, similarity features, and an estimated NDCG for each identified candidate query to generate a feature vector for each identified candidate query.

At block 516, the candidate queries are rank ordered. For example, candidate ranking module 432 applies a ranking function to the feature vectors associated with the set of candidate queries to order the candidate queries by the queries' effectiveness, as represented by the feature vectors.

At block 518, alternate queries are suggested. For example, a predetermined number (e.g, five) of the rank ordered candidate queries are presented through the user interface module 422.

At block 520, a user-submitted query selection is received. For example, through the user interface module 422, a user may select the original user-submitted query or may select one of the suggested alternate queries.

At block 508, the query selected by the user is submitted to a search engine; and at block 510, the query results are received and presented through the user interface module 422.

Conclusion

Although the subject matter has been described in language specific to structural features and/or methodological operations, it is to be understood that the subject matter defined in the appended claims is not necessarily limited to the specific features or operations described. Rather, the specific features and acts are disclosed as example forms of implementing the claims.

What is claimed is:

1. A method comprising:
   receiving a user-submitted query originating from a user; and
   in response to receiving the user-submitted query, and prior to returning search results associated with the user-submitted query:
      identifying a plurality of candidate queries, without further input from the user; for each candidate query, without further input from the user:
         extracting three or more features, each feature reflecting a measurement of effectiveness of the candidate query with respect to the user-submitted query, wherein the three or more features including an estimated normalized discounted cumulative gain, wherein the measurement of effectiveness of the candidate query based, at least in part, on a match feature that reflects how well the candidate query matches search results of the candidate query, a cross match feature that reflects how well the user-submitted query matches search results of the candidate query, and a similarity feature that reflects similarities between search results of the user-submitted query and search results of the candidate query; and
         generating a feature vector that includes each of the three or more features as individual components of the feature vector;
      rank ordering the candidate queries based at least in part on the feature vectors of the candidate queries; and
      suggesting one or more of the top-ranked candidate queries as alternate queries for the user-submitted query.

2. A method as recited in claim 1, wherein the match feature includes at least one of: a title match that reflects how well the candidate query matches titles of the search results of the candidate query; a snippet match that reflects how well the candidate query matches snippets of the search results of the candidate query; or a URL match that reflects how well the candidate query matches URLs of the search results of the candidate query.

3. A method as recited in claim 1, wherein the cross match feature includes at least one of: a title cross match that reflects how well the user-submitted query matches titles of the search results of the candidate query; a snippet cross match that reflects how well the user-submitted query matches snippets of the search results of the candidate query; or a URL cross match that reflects how well the user-submitted query matches URLs of the search results of the candidate query.

4. A method as recited in claim 1, wherein the similarity feature includes at least one of: a page similarity that reflects a similarity between the content of the search results of the user-submitted query and the content of the search results of the candidate query; a URL similarity that reflects a number of common URLs between the search results of the user-submitted query and the search results of the candidate query; or a domain similarity that reflects a number of common domains between the search results of the user-submitted query and the search results of the candidate query.

5. A method as recited in claim 1, wherein the feature vector includes, in addition to the estimated normalized discounted cumulative gain, a title match, a snippet match, a uniform resource locator (URL) match, a title cross match, a snippet cross match, a URL cross match, a page similarity, an URL similarity, and a domain similarity.

6. A method as recited in claim 1, wherein a value of the estimated normalized discounted cumulative gain is calculated based, at least in part, on an estimated relevance rating.

7. A method as recited in claim 6, wherein the estimated relevance rating represents, for each document in a set of search results, a number of times that the document is returned in the top n results of the candidate queries associated with the user-submitted query.

8. A method as recited in claim 1, wherein rank ordering the candidate queries based at least in part on the feature vectors comprises:
learning a ranking model based on training data; and
applying the ranking model to the feature vectors for each of the candidate queries.

9. A method comprising: receiving a user-submitted query originating from a user; determining whether the user-submitted query is a difficult query, wherein a difficult query is a query that will not return relevant or authoritative results;
in an event that the user-submitted query is not a difficult query: sending the user-submitted query to a search engine; receiving search results associated with the user-submitted query from the search engine; and presenting the search results associated with the user-submitted query; and in an event that the user-submitted query is a difficult query: identifying, without further input from the user, a plurality of candidate queries; for each candidate query, without further input from the user: generating a feature vector that includes three or more features, each of the three or more features being individual components of the feature vector, each feature reflecting a measurement of effectiveness of the candidate query with respect to the user-submitted query, the measurement of effectiveness of the candidate query based, at least in part, on search results of the candidate query, the three or more features including an estimated normalized discounted cumulative gain; and calculating a usefulness probability value based at least in part on the feature vector, wherein the usefulness probability value reflects an estimated quality of the search results for the candidate query with respect to the user-submitted query; rank ordering the candidate queries based on the usefulness probability values; and suggesting one or more of the top-ranked candidate queries as alternate queries for the user-submitted query;
in the event that the user-submitted query is a difficult query: receiving a user selection of a particular query selected from the user-submitted query and the alternate queries that are suggested; and presenting the search results associated with the particular query.

10. One or more non-transitory computer storage media encoded with computer-executable instructions that, when executed, configure a computer system to perform a method as recited in claim 1.

11. A method as recited in claim 9, wherein determining whether the user-submitted query is a difficult query comprises:
estimating a difficulty value associated with the user-submitted query, wherein the difficulty value represents a degree to which the user-submitted query is expected to return relevant or authoritative results; and
comparing the difficulty value to a threshold value.

12. One or more non-transitory computer storage media encoded with computer-executable instructions that, when executed, configure a computer system to perform a method as recited in claim 9.

13. A method comprising: receiving a user-submitted query originating from a user;
determining whether the user-submitted query is a difficult query, wherein a difficult query is a query that will not return relevant or authoritative results;
in an event that the user-submitted query is not a difficult query:
determining search results associated with the user-submitted query; and
presenting the search results associated with the user-submitted query; and
in an event that the user-submitted query is a difficult query:
identifying a plurality of candidate queries based on the user-submitted query;
for each candidate query of the plurality of candidate queries, determining, without further input from the user, a feature vector having three or more features as individual components of the feature vector, each feature reflecting a measurement of effectiveness of the candidate query with respect to the user-submitted query, the measurement of effectiveness of the candidate query based, at least in part, on search results of the candidate query, the three or more features including an estimated normalized discounted cumulative gain, and any combination of: one or more match features that reflect how well terms in the candidate query match search results of the candidate query, one or more cross-match features that reflect how well terms in the user-submitted query match search results of the candidate query, and one or more similarity features that reflect a degree of similarity between the search results of the user-submitted query and the search results of the candidate query;

rank ordering the plurality of candidate queries based at least in part on the feature vector of the respective candidate queries of the plurality of candidate queries; and suggesting, based on the rank ordering, one or more of the candidate queries as alternate queries for the user-submitted query.

14. A method a recited in claim 13, wherein determining the three or more features includes determining in addition to a value of the estimated normalized discounted cumulative gain, a value for each of a title match, a snippet match, a uniform resource locator (URL) match, a title cross match, a snippet cross match, a URL cross match, a page similarity, an URL similarity, and a domain similarity.

15. A method as recited in claim 13, wherein rank ordering the candidate queries is further based, at least in part, on a value of the estimated normalized discounted cumulative gain calculated based, at least in part, on an estimated relevance rating.

* * * * *